United States Patent
Bermes

(10) Patent No.: US 6,409,029 B1
(45) Date of Patent: Jun. 25, 2002

(54) TRIMMER RACK

(75) Inventor: Steven P. Bermes, Fort Wayne, IN (US)

(73) Assignee: Novae Corporation, Fort Wayne, IN (US)

(*) Notice: Subject to any disclaimer, the term of this patent is extended or adjusted under 35 U.S.C. 154(b) by 0 days.

(21) Appl. No.: 09/389,714

(22) Filed: Sep. 3, 1999

(51) Int. Cl.[7] .................................................. A47F 5/00
(52) U.S. Cl. ........................ 211/70.6; 211/4; 211/207; 248/297.21; 248/316.5
(58) Field of Search ........................... 211/4, 64, 70.6, 211/70.8, 207; 248/297.21, 305, 306, 307, 316.5

(56) References Cited

U.S. PATENT DOCUMENTS

| | | |
|---|---|---|
| 1,691,155 A | 11/1928 | Howell |
| 1,800,873 A * | 4/1931 | Reinhold |
| 3,111,723 A | 11/1963 | Bates |
| 3,143,981 A | 8/1964 | Tassell |
| 3,326,385 A * | 6/1967 | Pinkerton et al. ............... 211/4 |
| 3,731,817 A * | 5/1973 | Fowlkes et al. ............ 211/70.8 |
| 4,132,381 A | 1/1979 | McClellan |
| 4,170,335 A * | 10/1979 | King |
| 4,310,094 A | 1/1982 | Hotchkiss, Jr. |
| 4,450,989 A * | 5/1984 | Bogar ....................... 211/64 X |
| 4,538,784 A * | 9/1985 | O'Flannagan |
| 4,596,334 A * | 6/1986 | Paulton ........................ 211/64 |
| 4,696,405 A * | 9/1987 | Waring .......................... 211/4 |
| 4,776,471 A * | 10/1988 | Elkins .......................... 211/64 |
| 4,858,870 A | 8/1989 | Mazzanti |
| 5,361,611 A * | 11/1994 | Hisler ....................... 211/4 X |
| 5,524,772 A * | 6/1996 | Simmons ....................... 211/4 |
| 5,617,958 A | 4/1997 | Laug et al. |
| 5,622,347 A | 4/1997 | Nourry |
| 5,647,489 A | 7/1997 | Bellis, Jr. |
| 5,676,257 A * | 10/1997 | Adkins .......................... 211/4 |
| 5,746,330 A | 5/1998 | DiBetta |
| 5,964,358 A * | 10/1999 | Hafendorfer et al. ...... 211/70.6 |
| 6,073,781 A * | 6/2000 | Puglisi ...................... 211/70.6 |
| 6,173,842 B1 * | 1/2001 | Fitzgerald ...................... 211/4 |

FOREIGN PATENT DOCUMENTS

| | | |
|---|---|---|
| DK | 75134 | 12/1952 |
| FR | 642314 | 8/1928 |

OTHER PUBLICATIONS

The Ultimate Organizer Racks ( 7 pages) by Green Touch Industries, Inc.
Accessories Catalog (12 pages)—Aug. 1998, by Performance Trailers Inc.
Gear Caddy advertisement (2 pages) by Jungle Jim's Accessory Products, Inc.
Rac–Loc Inc., advertisement (2 pages).
Trimmertrap advertizement ( 6 pages) by Trimmertrap Inc.
Easy Lock Trimmer & Backpack Racks (1 page) by Performance Trailers, Inc.

* cited by examiner

Primary Examiner—Robert W. Gibson, Jr.
(74) Attorney, Agent, or Firm—George Pappas

(57) ABSTRACT

A trimmer rack for selectively supporting grass trimmers on a trailer. The trimmer rack includes two support members. Bracket members are attached to one of the support members so as to retain and support one end of the trimmers. Trimmer rack mechanisms are provided on the other support member for selectively supporting and lockingly retaining the other end of the trimmers. The trimmer rack mechanisms include a hook member attached to the support member and a pivot arm selectively pivotable thereover between closed and open positions. A lock mechanism is provided for selectively locking the pivot arm in its closed position. An abutment wall is selectively attached to the hook member and is adjustable for increasing and decreasing the trimmer retaining area.

33 Claims, 3 Drawing Sheets

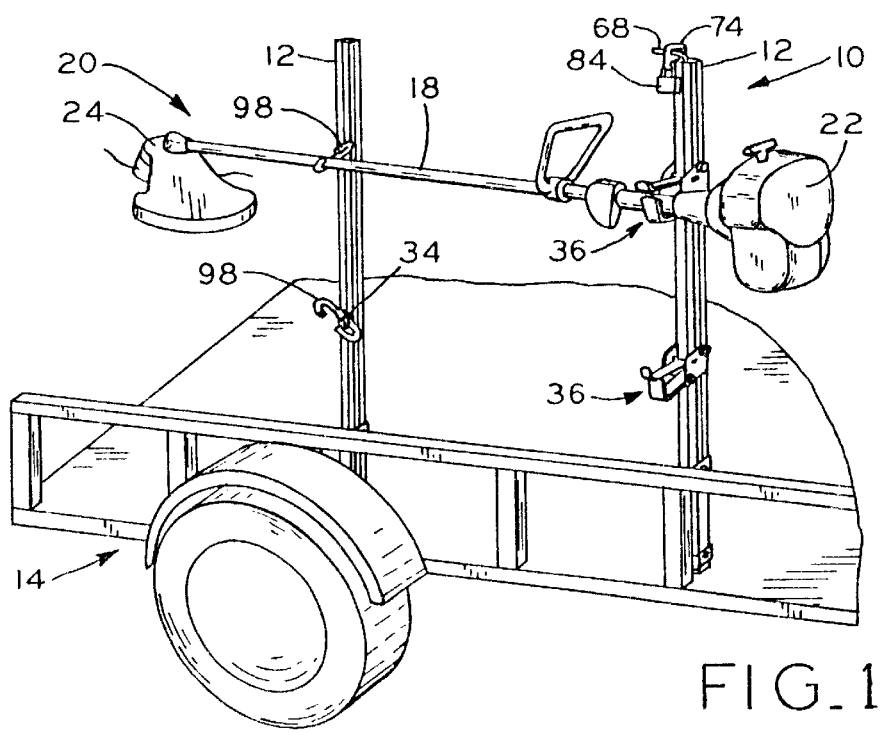
FIG_1
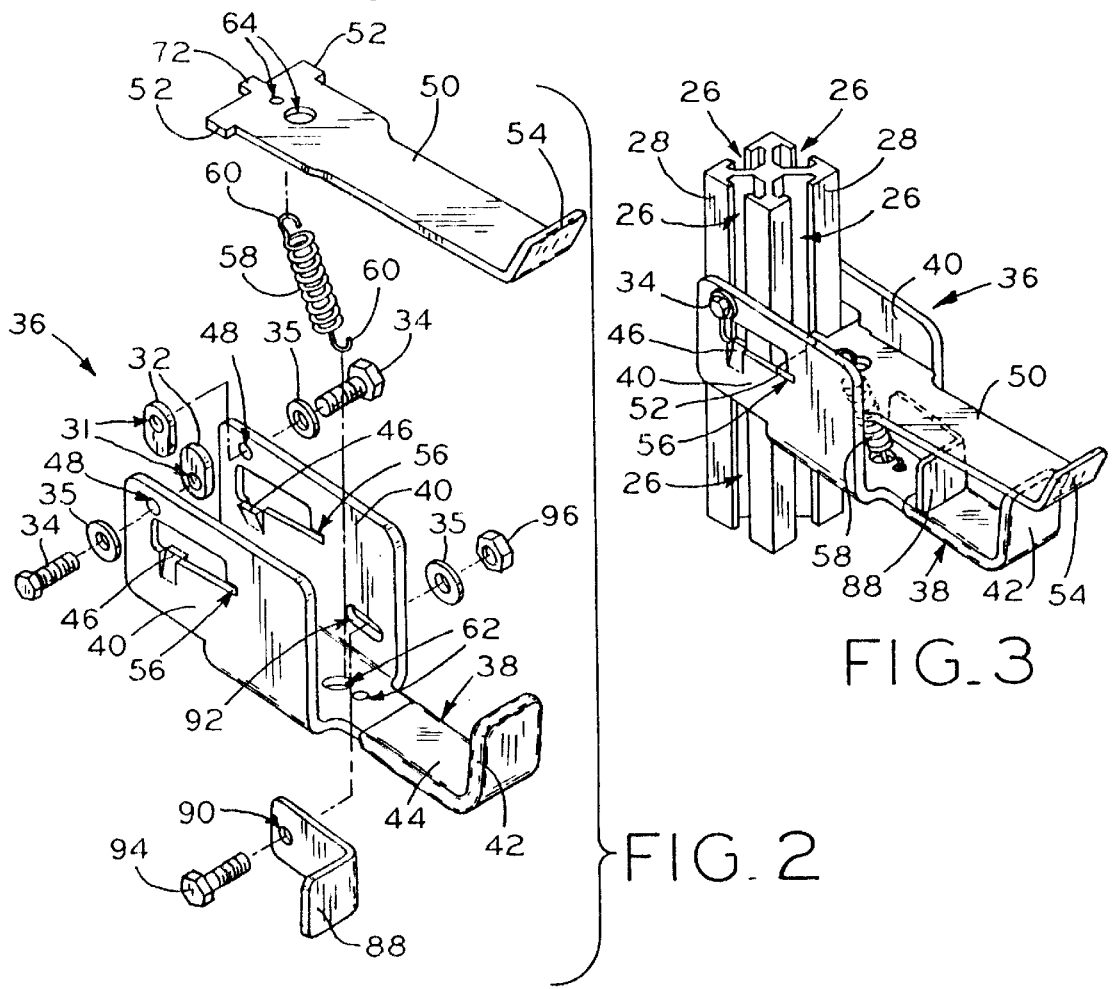
FIG_2
FIG_3

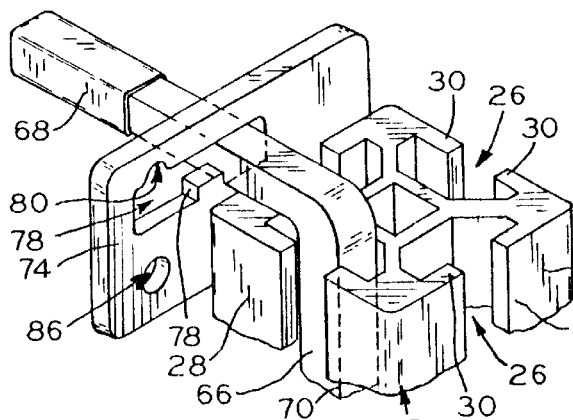
FIG_7
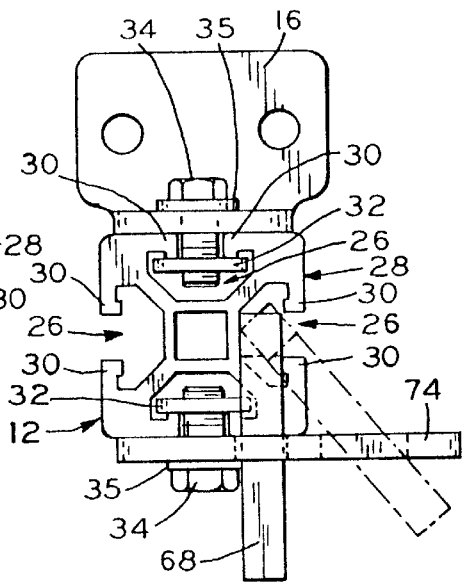
FIG_9
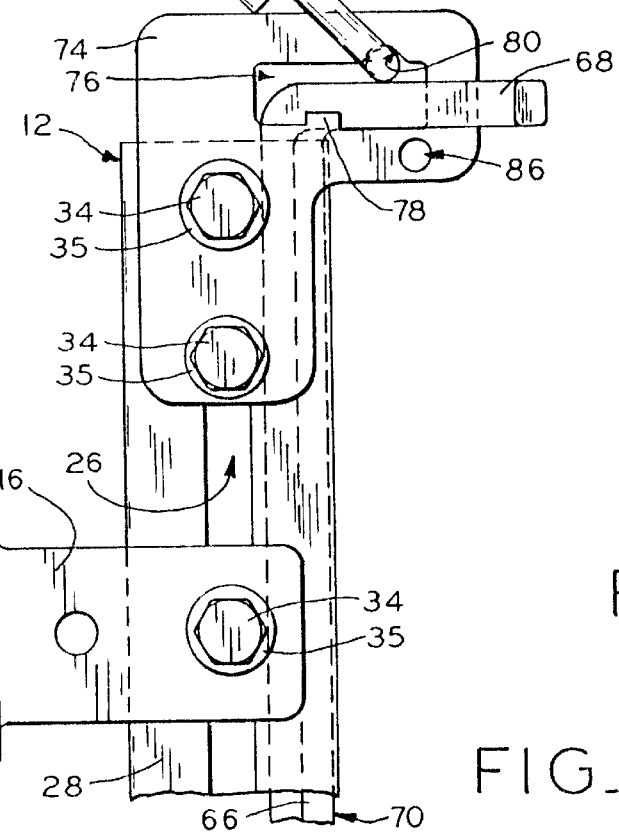
FIG_8
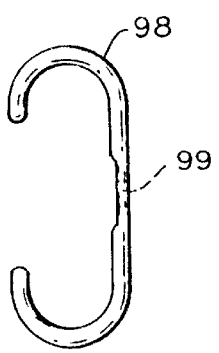
FIG_10

TRIMMER RACK

TECHNICAL FIELD

The present invention relates to the technical field of racks for selectively supporting grass trimmers. More particularly, the present invention relates to a trimmer rack which can be mounted on a trailer, truck, van, etc., and whereupon grass trimmers can be selectively supported and locked in place.

BACKGROUND OF THE INVENTION

Grass trimmers are today very commonly used in cutting grass and other plants and maintaining lawns and landscaping. Grass trimmers, sometimes also referred to as string trimmers, typically include a gas engine from where a long neck extends to the trimmer head. At the trimmers head a string is rotated at a high speed for cutting grass and other plants. In view of their shape, when not in use, grass trimmers are generally difficult to store in an efficient yet reliable manner whereby they will not be damaged. This is particularly problematic in the lawn maintenance business which typically carries trimmers, lawn mowers and/or other tools from site to site on a trailer. Trimmers merely placed on the trailer tend to roll around and slide while in transit typically causing the trimmers and other equipment on the trailer to be damaged. Additionally, while parked, trimmers which are merely placed on the trailer and not otherwise secured may be stolen.

Although prior trimmer racks have been devised such as, for example, that disclosed in U.S. Pat. No. 5,647,489, they are difficult to use and/or adapt for different size and types of trimmers. Accordingly a need exists for a trimmer rack which can be mounted on a trailer or other vehicles and which can support trimmers while in transit and which can readily and generally easily be locked and, further, which is easily and readily adaptable for supporting various sizes and types of trimmers.

SUMMARY OF THE INVENTION

It is the principal object of the present invention to overcome the above-discussed disadvantages associated with prior trimmer racks and which fulfills the desired above-discussed needs.

The present invention, in general includes a pair of elongate support members which are adapted to be mounted parallel to one another on a trailer. The support members include longitudinal channels whereupon the trimmer rack components can be attached with fasteners anywhere along the length thereof. Brackets are attached to one of the support members and are adapted to support one end of a trimmer. On the other support member latch mechanisms are provided for supporting and securing the other end of a trimmer. Any number of brackets and latch mechanisms can be attached anywhere along the support members so that different types and size trimmers can be supported as desired along the elongate support members.

The latch mechanisms include a hook member attached to the support member and extending away therefrom. A pivot arm is pivotally supported on the hook member and is selectively pivotable thereover so that a trimmer placed on the hook member will be securely retained thereon. A spring is connected between the pivot arm and the hook member and biases the pivot arm over the hook member. The pivot arm includes a pair of ears which are selectively slidable in and out of a pair of slots located on the legs of a U-shaped portion of the hook member. The spring further biases the pivot arm and the ears thereof into the slots. With the pivot arm ears in the slots, the pivot arm is prevented from pivoting. To pivot or rotate the pivot arm, it must be pushed toward the support member first causing the pivot arm ears to slide out of the slots and allowing it to pivot upwardly thereby gaining access to the hook whereat the trimmer can be placed or removed. The support member is preferably located between the U-shaped portion legs and the U-shaped portion legs are attached to the support member with fasteners as desired anywhere along the support member. A selectively movable abutment wall is selectively attached to a leg of the U-shaped portion so that the hook member can be selectively enlarged or decreased in size to accommodate different size trimmers.

A square bar extends longitudinal through one of the support member channels and is selectively rotatable about its longitudinal axis. By rotating and placing a corner of the square bar next to or adjacent the pivot arm, the pivot arm ears are prevented from sliding out of the slots thereby retaining the pivot arm over the hook member in a closed position. By rotating the square bar and placing a flat side of the square bar next to or adjacent the pivot arm, the pivot arm ears are allowed to slide out of the slots thereby also allowing the pivot arm to pivot upwardly and gaining access to the hook member. A lock mechanism is provided for locking the square bar in the position wherein a corner thereof is located next to the pivot arm thereby selectively locking the pivot arm the closed position over the hook member.

In one form thereof, the present invention is directed to a trimmer rack including an elongate support member. A hook member extends from the support member. A pivot arm is selectively pivotable over the hook member whereby a trimmer selectively placed on the hook member is selectively retained thereon with the pivot arm.

In one form thereof, the present invention is directed to a trimmer rack including a pair of elongate support members. Each of the support members include a longitudinally extending channel. Trimmer support devices are provided and fastening elements extend into the channels for attaching the support devices along the support members.

DESCRIPTION OF THE DRAWINGS

The above-mentioned and other features and objects of this invention and the manner of obtaining them will become more apparent and the invention itself will be better understood by reference to the following description of embodiments of the invention taken in conjunction with the accompanying drawings wherein:

FIG. 1 is a perspective view of a trimmer rack constructed in accordance with the principles of the present invention and mounted on a trailer;

FIG. 2 is an exploded perspective view of a trimmer rack mechanism constructed in accordance with the principles of the present invention;

FIG. 3 is an assembled view of the trimmer rack mechanism shown in FIG. 2;

FIG. 7 is a perspective view of a trimmer rack lock mechanism constructed in accordance with the principles of the present invention;

FIG. 8 is a side elevation view of the lock mechanism shown in FIG. 7 and further depicting a trailer attachment bracket;

FIG. 9 is a top plan view of the lock mechanism shown in FIG. 7; and,

FIG. 10 is a side elevation view of a trimmer rack bracket constructed in accordance with the principles of the present invention.

Corresponding reference characters indicate corresponding parts throughout the several views of the drawings.

Figure 4:
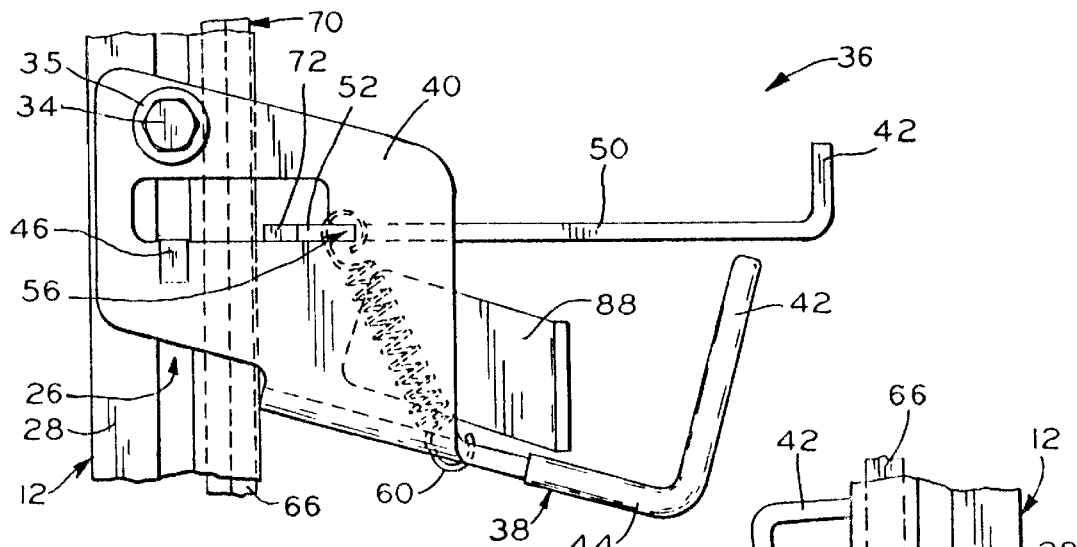
FIG. 4 is a left side elevation view of the trimmer rack mechanism shown in FIG. 3.

The exemplifications set out herein illustrate preferred embodiments of the invention in one form thereof and such exemplifications are not to be construed as limiting the scope of the disclosure or the scope of the invention in any manner.

DETAILED DESCRIPTION OF SPECIFIC EMBODIMENTS

Referring initially to FIG. 1, a trimmer rack constructed in accordance with the principles of the present invention is shown and generally depicted by the numeral 10. Trimmer rack 10 includes a pair of elongate support members 12 adapted to be mounted on a side wall of an open trailer 14. Preferably, support members 12 are attached to the trailer side wall with trailer attachment brackets 16 and fasteners such as screws and bolts. The elongate support members 12 are attached to the trailer 14 and are supported so as to be parallel with one another and at a distance from each other shorter than the overall length of the neck 18 of a grass trimmer generally depicted by the numeral 20 and shown in FIG. 1. Grass trimmer 20 further includes a gas engine 22 and a head 24 in a known and customary manner so as cut grass and other plants.

Support members 12, as best seen in FIGS. 3, 7, and 9, are generally square in cross-section and include four longitudinal channels 26 extending into the support member 12 from each side 28 thereof. A pair of lips 30 extend over each channel. Elongate support members 12 are preferably made of aluminum by an extrusion process and are cut to a length as desired for accommodating and supporting a desired number of trimmers 20. As best seen in FIG. 9, elements 32 having a threaded hole 31 are adapted to be longitudinal received within the channels 26 and a threaded bolt 34 is threadingly received in hole 31, By threadingly engaging bolt 34 through hole 31 of element 32, the various components of the trimmer rack are selectively detachably attachable anywhere along the longitudinal length of the support member 12 and on anyone of the four channels 26 thereof For example, as shown in FIG. 9, the trailer attachment bracket 16 is attached to the support member 12 by extending the threaded bolt 34 through the washer 35 into the channel 26 whereat bolt 34 is threadingly received within the threaded hole 31 of element 32. By tightening bolt 34, element 32 is forced toward the lips 30 thereby sandwiching and clamping lips 30 and securing the attachment bracket 16 onto the support member 12.

Referring now more particularly to FIGS. 2–6, a trimmer rack mechanism generally depicted by the numeral 36 is provided and is attached to a support member 12. Trimmer rack mechanism 36 includes a hook member 38 having a U-shaped portion made up of legs 40. At the other end thereof, hook member 38 includes an arm 42 extending generally vertically upwardly and thereby defining a trimmer retaining area between the arm 42 and the legs 40 of the U-shaped portion. As shown in FIG. 1, a trimmer 20 is selectively supported and retained on the hook member 38 in the trimmer retaining area. The hook member 38 is preferably made of steel by a stamping process thereby forming the U-shaped portion by bending legs 40 to a position parallel with one another as shown and by bending the arm 42 perpendicular to the remaining hook member 38 as shown. A rubber boot 44 is provided over arm 42 and a portion of the hook member 38.

Legs 44 extend toward the rear of hook member 38, and as shown, are adapted to receive an elongate support member 12 therebetween. Tabs 46 are punched inwardly from each of the legs 40 and are adapted to be received between opposing lips 30 of channels 26. For attaching hook member 38 onto a support member 12, the hook member 38 is slid longitudinally over the support member 12 with tabs 46 extending into opposing channels 26 and with the support member 12 located between the U-shaped portion legs 40. Bolts 34 are also provided and extend through holes 48 whereat they threadingly engage an element 32 received within a channel 26. As can now be appreciated, hook member 38 can be longitudinally slid anywhere along the support member 12 to a desired height or position and by tightening bolts 34 secured thereat as shown.

Figure 5:
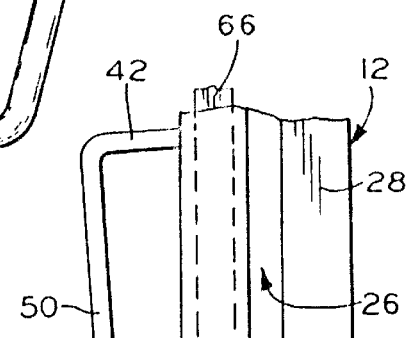
FIG. 5 is right side elevation view of the trimmer rack shown in FIG. 3 and showing the pivot arm in the open position.

A pivot arm 50 is provided and is adapted to be pivoted over the hook member 38 between a generally horizontal or closed position as shown in FIG. 4, and a vertical or opened position as shown in FIG. 5. Pivot arm 50 is also preferably made of steel by a stamping process and includes a pair of ears 52 and a bent push handle 54. Slots 56 are cut into both of the legs 40 of the U-shaped portion and, as shown, are adapted to selectively receive the ears 52 of the pivot arm 50. A spring 58 is attached between the hook member 38 and pivot arm 50 by extending the spring ends 60 through the punched holes 62 of the hook member 38 and the punched holes 64 of the pivot arm 50. As best seen in FIG. 4, punched holes 62 and 64 and the length of spring 58 are such that spring 58 biases or pulls the pivot arm 50 downwardly over the hook member 38 and also pulls the ears 52 of pivot arm 50 toward and into the slots 56. Thus, when the pivot arm 50 is in the position shown in FIG. 5, spring 58 acts on the pivot arm 50 causing it to rotate downwardly and over the hook member 38. Further, when the pivot arm 50 is horizontally disposed as shown in FIG. 4, the spring 58 pulls the pivot arm 50 away from the support member 12 and locating or pulling the ears 52 of the pivot arm 50 into the slots 56. As can be appreciated, in this closed position, pivot arm 50 is prevented from rotating upwardly or opening unless pivot arm 50 is first pushed backwardly toward the support member 12 causing the ears 52 to slide out of the slots 56 and thereby allowing the pivot arm 50 to be rotated upwardly into the open position.

Figure 6:
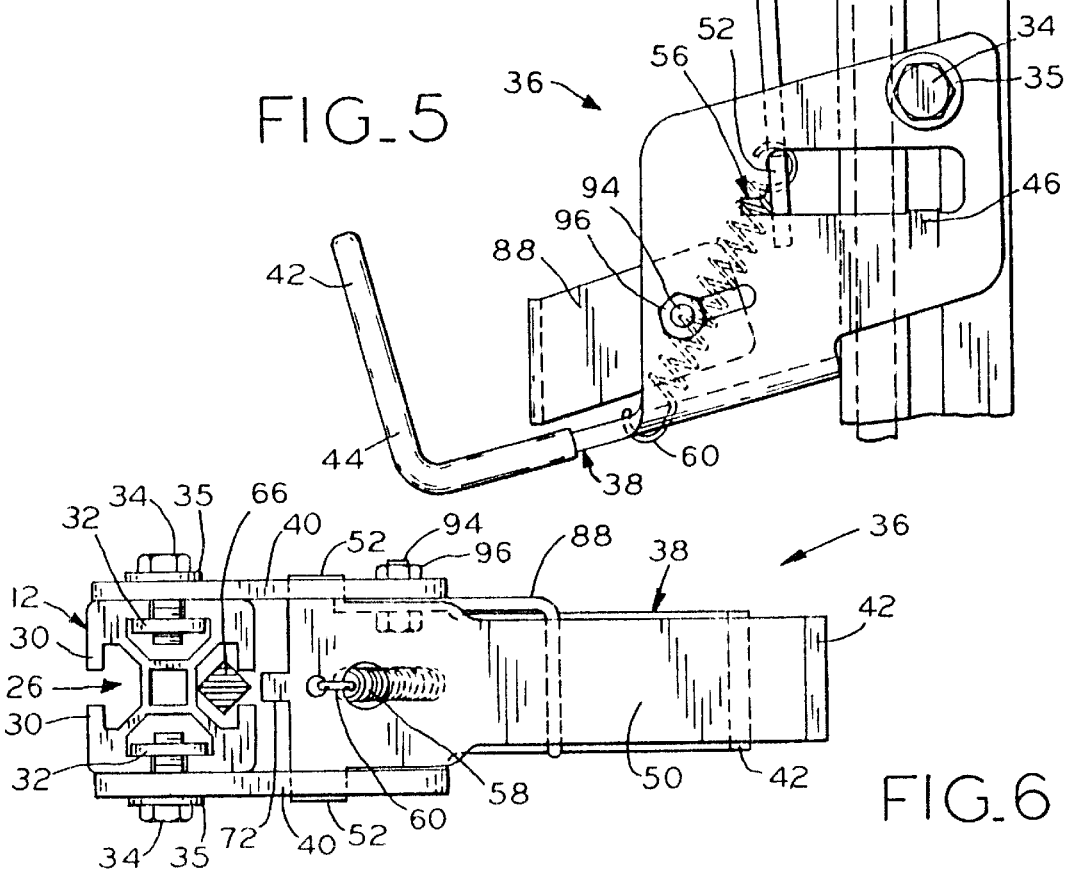
FIG. 6 is a top plan view of the trimmer rack mechanism shown in FIG. 3.

So as to selectively lock and unlock the pivot arm 50 in the closed position, an elongate square bar 66 having a bent handle 68 is provided and is received within the channel 26 facing or adjacent the pivot arm 50. Elongate square bar 66 is preferably made of steel with the handle 68 being formed by bending one end thereof at about a 90 degree angle. Square bar 68 is selectively rotatable about its longitudinal axis within channel 26 between an unlocked position as shown in solid lines in FIG. 9 and in FIG. 7, and a locked position as shown in dash lines in FIG. 9 and as also shown in FIG. 8. In the locked position, a corner 70 of the square bar 66 extends outwardly of channel 26 and placing corner 70 next to or adjacent the tooth 72 of pivot arm 50. In this position, as best seen in FIGS. 4 and 6, pushing the pivot arm backwardly toward the support member 12 causes the tooth member 72 to hit the corner 70 of square bar 66 before ears 52 are fully slid out of the slots 56. Thus, while the square bar 66 is in the locked position, ears 52 are prevented from sliding out of the slots 56 and pivot arm 50 is retained in the closed position and is prevented from rotating upwardly. By turning handle 68 of the square bar 66 and rotating the square bar 66 to the unlocked position and placing a flat side thereof next to or facing the pivot arm 50, as shown in FIG. 7, tooth 72 of pivot arm 50 and the pivot arm itself are again free to slide backwardly toward the support member 12 and causing the ears 52 to slide out of the slots 56. In this manner, by first placing the square bar 66 in the unlocked rotational position, pivot arm 50 can be pushed backwardly causing ears 52 to slide out of slots 56 and allowing the pivot arm 50 to be rotated upwardly and placed in the open position.

For selectively locking the square bar 66, a plate 74 is provided and is attached to the support member 12 with elements 32 and bolts 34 similar to the attachment of other components as discussed hereinabove. Plate 74 is also made of steel and is preferably made by stamping and includes an aperture 76 wherethrough handle 68 extends. Aperture 76 is shaped as shown for allowing the handle 68 to be pivoted between the open position as shown in FIG. 7, and over the stop projection 78 to the locked position as shown in FIG. 8. Aperture 76 is further provided with an indentation 80 whereat a bail 82 of a padlock 84 can be received over the handle 68. By placing the bail 82 of padlock 84 therein as shown in FIG. 8, the handle 68 is prevented from being rotated over the stop projection 78 and, thus, square bar 66 is retained in the locked position. For unlocking, the bail 82 of the padlock 84 is merely removed from the indentation 80 allowing the handle 68 to be rotated over the stop projection 78 into the unlocked position. Punched hole 86 is also provided through plate 74 and can be used for hanging the padlock 84 therefrom when not being used for locking handle 68.

For accommodating different size trimmers and preventing the trimmers from excessive vibration during transit, the trimmer retaining area of the hook member 38 is selectively enlarged or decreased in size by providing an abutment wall member 88 which is preferably L-shaped as shown. Abutment wall member 88 is preferably made of steel also by a stamping and bending process. Abutment wall member 88 includes a punched hole 90 and one of the legs 40 of the U-shaped portion is provided with a punched corresponding slot 92. A bolt 94 is received through hole 90 and slot 92 and threadingly engages nut 96 for attaching and affixing the abutment wall member 88 on the hook member 38 as shown. As can be appreciated, abutment wall member 88 can be slid and affixed anywhere along slot 92 for thereby selectively enlarging or decreasing the trimmer retaining area of the hook member 38 which thus becomes the area between the hook member arm 42 and the abutment wall member 88.

For fully supporting and retaining a trimmer 20 as shown in FIG. 1, one end thereof is selectively supported on a trimmer rack mechanism 36. The other end of the trimmer neck 18 is supported by a bracket member 98 which is attached to the second support member 12 as shown. Bracket member 98 includes a hole 99 through which a threaded bolt 34 extends and is attached to the support member 12 similar to the other components as described hereinabove using a bolt 34 and threaded element 32 combination. Preferably, bracket members 98 are C-shaped as shown and are affixed to the support member 12 at a diagonal or about 45 degrees from the support member 12. As best seen in FIG. 10, hole 99 extends through a flattened portion generally at the center of the C-shaped bracket 98. When placing a trimmer 20 on the trimmer rack 10, the trimmer neck 18 is first placed at an angle with respect to the support member 12 so as to insert the neck 18 into the C-shaped bracket member 98. Thereafter, the trimmer 20 is pivoted to a generally horizontal position and the other end of neck 18 is placed onto the trimmer rack mechanism 36 as described hereinabove. Bracket members 98 are preferably made of round steel bar which has been bent so as to form the C-shape as shown.

While the invention has been described as having specific embodiments, it will be understood that it capable of further modifications. This application is, therefore, intended to cover any variations, uses or adaptations of the invention following the general principles thereof and including such departures from the present disclosure as come within known or customary practice in the art to which this invention pertains and fall within the limits of the appended claims.

What is claimed is:

1. A trimmer rack comprising:
    an elongate support member;
    a hook member extending from said support member; and,
    a pivot arm selectively pivotable over and slidable along said hook member, whereby a trimmer selectively placed on said hook member is selectively retained thereon with said pivot arm.

2. The trimmer rack of claim 1 further comprising a spring connected to said pivot arm and biasing said pivot arm over said hook member.

3. A trimmer rack comprising:
    an elongate support member;
    a hook member extending from said support member;
    a pivot arm selectively pivotable over said hook member, whereby a trimmer selectively placed on said hook member is selectively retained thereon with said pivot arm;
    a spring connected to said pivot arm and biasing said pivot arm over said hook member; and,
    wherein said pivot arm includes a pair of ears selectively slidable in and out of a pair or slots and wherein, once said ears are in said slots, said pivot arm is over said hook member and is prevented from pivoting unless said ears are slid out of said slots.

4. The trimmer rack of claim 3 wherein said hook member includes a U-shaped portion having two legs, said pair of slots located on said U-shaped portion legs and said pivot arm partially located between said U-shaped portion legs.

5. The trimmer rack of claim 4 wherein said elongate support member is located between said U-shaped portion legs and fasteners attach said legs to said support member.

6. The trimmer rack of claim 5 further comprising means for selectively retaining said ears in said slots thereby preventing said arm from pivoting.

7. The trimmer rack of claim 6 further comprising a selectively movable abutment wall adjacent said hook member whereby said hook member is selectively enlarged or decreased in size.

8. The trimmer rack of claim 6 further comprising a second elongate support member generally parallel to said first support member and a bracket member extending from said second support member, whereby a trimmer is selectively supported between said bracket member and said hook member.

9. The trimmer rack of claim 5 further comprising a square bar selectively rotatable about its longitudinal axis and located adjacent to said pivot arm, whereby rotating and placing a corner of said square bar next to said arm prevents said arm ears from sliding out of said slots and rotating and placing a flat side of said square bar next to said arm allows said arm ears to slide out of said slots.

10. The trimmer rack of claim 9 further comprising lock means for selectively locking said square bar in a rotational position with a corner thereof next to said pivot arm.

11. The trimmer rack of claim 10 further comprising a second elongate support member generally parallel to said first support member and a bracket member extending from said second support member, whereby a trimmer is selectively supported between said bracket member and said hook member.

12. The trimmer rack of claim 10 further comprising a selectively movable abutment wall adjacent said hook member whereby said hook member is selectively enlarged or decreased in size.

13. The trimmer rack of claim 1 wherein said pivot arm includes a pair of ears selectively slidable in and out of a pair of slots on said hook member and wherein, once said ears are in said slots, said pivot arm is over said hook member and is prevented from pivoting unless said ears are slid out of said slots.

14. The trimmer rack of claim 13 wherein said hook member includes a U-shaped portion having two legs, said pair of slots located on said U-shaped portion legs and said pivot arm partially located between said U-shaped portion legs.

15. The trimmer rack of claim 14 wherein said elongate support member is located between said U-shaped portion legs and fasteners attach said legs to said support member.

16. The trimmer rack of claim 15 further comprising a selectively movable abutment wall adjacent said hook member whereby said hook member is selectively enlarged or decreased in size.

17. The trimmer rack of claim 15 further comprising a square bar selectively rotatable about its longitudinal axis and located adjacent to said pivot arm, whereby rotating and placing a corner of said square bar next to said arm prevents said arm ears from sliding out of said slots and rotating and placing a flat side of said square bar next to said arm allows said arm ears to slide out Of said slots.

18. The trimmer rack of claim 17 further comprising lock means for selectively locking said square bar in a rotational position with a corner thereof next to said pivot arm.

19. The trimmer rack of claim 13 further comprising a selectively movable abutment wall adjacent said hook member whereby said hook member is selectively enlarged or decreased in size.

20. The trimmer rack of claim 13 further comprising a square bar selectively rotatable about its longitudinal axis and located adjacent to said pivot arm, whereby rotating and placing a corner of said square bar next to said arm prevents said arm ears from sliding out of said slots and rotating and placing a flat side of said square bar next to said arm allows said arm ears to slide out of said slots.

21. The trimmer rack of claim 20 further comprising lock means for selectively locking said square bar in a rotational position with a corner thereof next to said pivot arm.

22. The trimmer rack of claim 1 further comprising means for selectively retaining and preventing said arm from sliding and pivoting.

23. The trimmer rack of claim 1 further comprising a selectively movable abutment wall adjacent said hook member whereby said hook member is selectively enlarged or decreased in size.

24. The trimmer rack of claim 1 further comprising a second elongate support member generally parallel to said first support member and a bracket member extending from said second support member whereby a trimmer is selectively supported between said bracket member and said hook member.

25. The trimmer rack of claim 24 wherein said bracket member is C-shaped.

26. The trimmer rack of claim 1 wherein said support member includes a plurality of elongate channels and said hook member is attached to said support member with fasteners extending into said channels.

27. The trimmer rack of claim 26 further comprising a spring connected to said pivot arm and biasing said pivot arm over said hook member.

28. The trimmer rack of claim 26 wherein said pivot arm includes a pair of ears selectively slidable in and out of a pair or slots and wherein, once said ears are in said slots, said pivot arm is over said hook member and is prevented from pivoting unless said ears are slid out of said slots.

29. The trimmer rack of claim 28 wherein said hook member includes a U-shaped portion having two legs, said pair of slots located on said U-shaped portion legs and said pivot arm partially located between said U-shaped portion legs.

30. The trimmer rack of claim 28 further comprising a square bar selectively rotatable about its longitudinal axis and located adjacent to said pivot arm, whereby rotating and placing a corner of said square bar next to said arm prevents said arm ears from sliding out of said slots and rotating and placing a flat side of said square bar next to said arm allows said arm ears to slide out of said slots.

31. The trimmer rack of claim 26 further comprising means for selectively retaining said ears in said slots thereby preventing said arm from pivoting.

32. A trimmer rack comprising:
   a pair of elongate support members;
   each of said support members including a longitudinally extending channel;
   trimmer support devices;
   fastening means extending into said channels for selectively clamping onto said support members and attaching said support devices along said members; and,
   wherein said support devices include a C-shaped bracket.

33. A trimmer rack comprising:
   a pair of elongate support members;
   each of said support members including a longitudinally extending channel;
   trimmer support devices;
   fastening means extending into said channels for selectively clamping onto said support members and attaching said support devices along said members; and,
   wherein said trimmer support devices include a hook member.

* * * * *